(12) United States Patent
Lucà et al.

(10) Patent No.: US 11,938,754 B2
(45) Date of Patent: Mar. 26, 2024

(54) ANTI-LOOSENING DEVICE FOR A FASTENING UNIT OF A MOTOR-VEHICLE WHEEL

(71) Applicant: FCA Italy S.p.A., Turin (IT)

(72) Inventors: Stefano Lucà, Turin (IT); Renato Badino, Turin (IT)

(73) Assignee: FCA ITALY S.P.A., Turin (IT)

( * ) Notice: Subject to any disclaimer, the term of this patent is extended or adjusted under 35 U.S.C. 154(b) by 616 days.

(21) Appl. No.: 17/149,873

(22) Filed: Jan. 15, 2021

(65) Prior Publication Data

US 2021/0354504 A1 Nov. 18, 2021

(30) Foreign Application Priority Data

May 13, 2020 (EP) .................................... 20174331

(51) Int. Cl.
*B60B 3/14* (2006.01)
*B60B 3/16* (2006.01)

(52) U.S. Cl.
CPC .............. *B60B 3/142* (2013.01); *B60B 3/165* (2013.01)

(58) Field of Classification Search
CPC ................................ B60B 3/142; B60B 3/165
See application file for complete search history.

(56) References Cited

U.S. PATENT DOCUMENTS

| 3,581,609 | A | 6/1971 | Greenwood |
| 4,591,211 | A | 5/1986 | Browning et al. |
| 5,846,042 | A | 12/1998 | Iannuzzi |
| 7,922,258 | B2 * | 4/2011 | Baumann ................ B60B 3/142 |
| | | | 301/111.01 |
| 2019/0111729 | A1* | 4/2019 | Baumann ................ B60B 3/142 |

FOREIGN PATENT DOCUMENTS

| DE | 102011011005 A1 | 9/2011 |
| DE | 102018007928 A1 * | 3/2019 |
| DE | 102017124318 A1 | 4/2019 |

OTHER PUBLICATIONS

European Search Report dated Sep. 30, 2020.

* cited by examiner

*Primary Examiner* — Kip T Kotter
(74) *Attorney, Agent, or Firm* — Heslin Rothenberg Farley & Mesiti P.C.

(57) ABSTRACT

An anti-loosening device for a fastening unit of a motor-vehicle wheel is configured to be coupled with a wheel hub. The anti-loosening device is configured to be arranged within the wheel hub along an axial direction, so that a main axis of the anti-loosening device coincides with the wheel axis. The anti-loosening device includes a gear arranged to cooperate with inner teeth of the wheel hub, an elastic element extending axially with respect to the gear, and a coupling element obtained on a sector of said gear, arranged to receive a corresponding fastening. During assembly of the wheel—hub assembly, the anti-loosening device is arranged to create a compressed configuration, wherein the gear is decoupled with respect to the inner teeth, and is arranged within a cavity portion obtained on the inner surface of the wheel hub, so as to allow rotation of the anti-loosening device around the main axis.

15 Claims, 12 Drawing Sheets

ANTI-LOOSENING DEVICE FOR A FASTENING UNIT OF A MOTOR-VEHICLE WHEEL

CROSS REFERENCE TO RELATED APPLICATIONS

Figure 1:
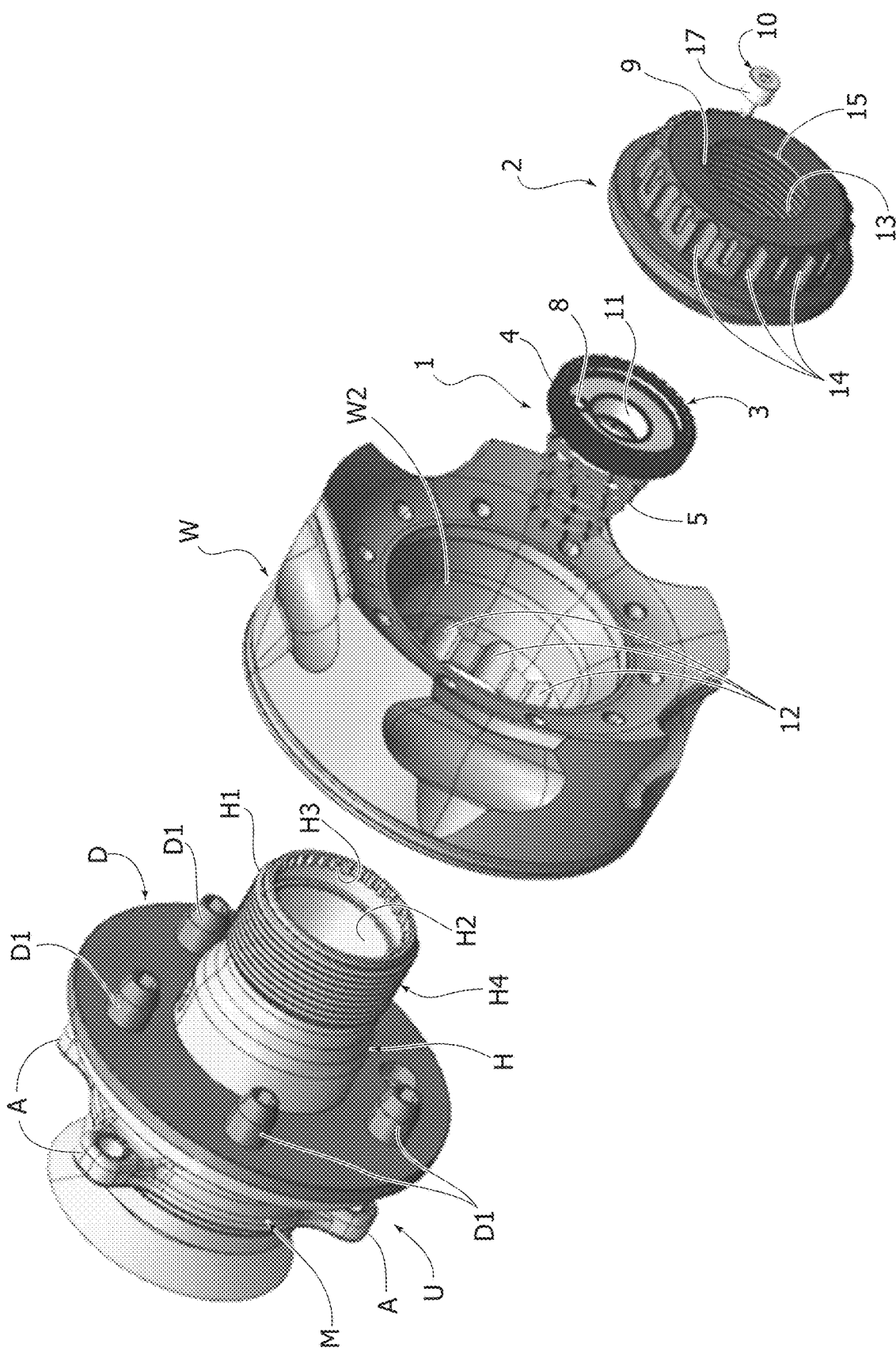

This application claims priority from European Patent Application No. 20174331.7 filed on May 13, 2020, the entire disclosure of which is incorporated herein by reference.

FIELD OF THE INVENTION

The present invention relates to an anti-loosening device for a fastening unit of a motor-vehicle wheel, wherein the motor-vehicle wheel is configured to be coupled to a wheel hub by means of said fastening unit.

PRIOR ART

In the field of high-performance cars, the use of single-nut fastening systems to fasten the wheels to the respective wheel hubs is widespread, as these systems allow significant reduction of the time required to change one or more wheels, compared to traditional fastening systems.

The present invention starts from the desire to provide an anti-loosening device for a motor-vehicle wheel assembly comprising a single-nut fastening unit, and a related assembly method of the wheel assembly, which is particularly effective in preventing loosening or over-tightening of the fastening unit during operation, caused, for example, by the effect of the driving torque and the braking torque.

OBJECT OF THE INVENTION

The object of the present invention is to provide an anti-loosening device for a fastening unit of a motor-vehicle wheel that meets the above requirements.

Another object of the invention is to provide an anti-loosening device that lends itself to be easily implemented, in order to minimize the anomalies resulting from loosening or over-tightening the locking unit.

An additional object of the invention is to provide a simple, low-cost device that is uniquely usable for wheels and hubs arranged on both sides of a motor-vehicle.

Another object of the invention is to propose an assembly method for assembling a motor-vehicle wheel assembly including a device of the type indicated above, which is particularly simple.

SUMMARY OF THE INVENTION

In view of achieving these objects, the invention relates to an anti-loosening device for a fastening unit of a motor-vehicle wheel, wherein the motor-vehicle wheel is configured to be coupled with a wheel hub by means of said fastening unit, said anti-loosening device comprising:

- a gear having outer teeth arranged to cooperate with inner teeth of the wheel hub obtained at an end portion of the wheel hub along an inner surface thereof,
- an elastic element extending axially with respect to said gear, having a first end connected to the gear, and a second end configured to be engaged against at least one abutment and centering surface obtained inside the wheel hub,
- at least one coupling element obtained on a sector of said gear, arranged to receive a corresponding fastening member, said anti-loosening device being configured to be arranged within the wheel hub along an axial direction, so that a main axis of the anti-loosening device coincides with the wheel axis, said anti-loosening device being arranged to create a compressed configuration, wherein the gear is decoupled with respect to said inner teeth, and is arranged within a cavity portion obtained on the inner surface of the wheel hub, so as to allow rotation of the anti-loosening device around said main axis;

wherein, following a rotation of said anti-loosening device, said coupling element is arranged to be radially aligned with respect to a respective anti-rotation sector obtained on said fastening unit, in such a way that said fastening member coupled to said coupling element cooperates with said anti-rotation sector, to avoid loosening of the locking unit.

As specified in the attached claims, the present invention also relates to a motor-vehicle wheel assembly including the aforesaid device, and relative assembly method.

DETAILED DESCRIPTION OF THE EMBODIMENTS

Figure 2:
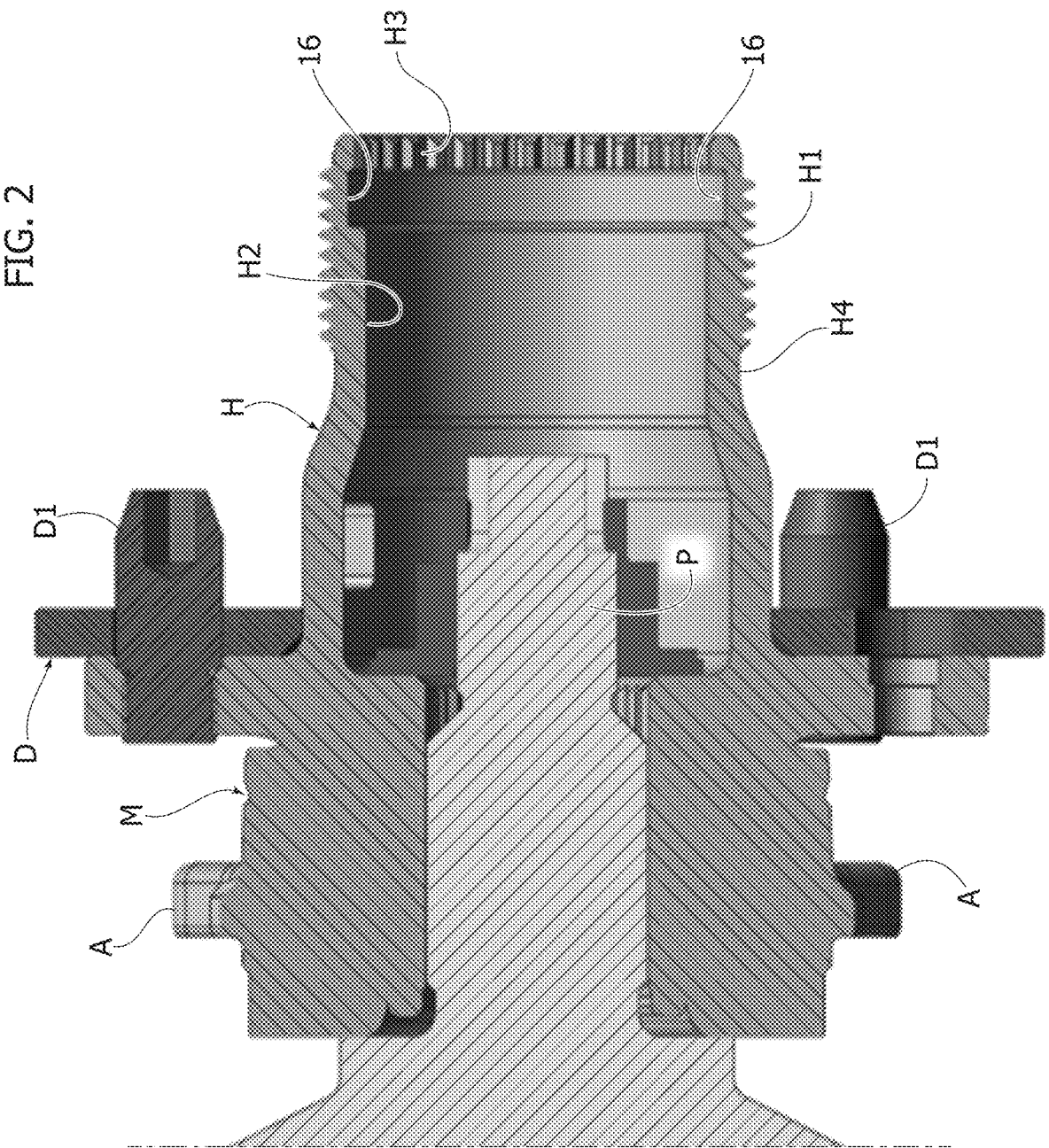
Figure 3:
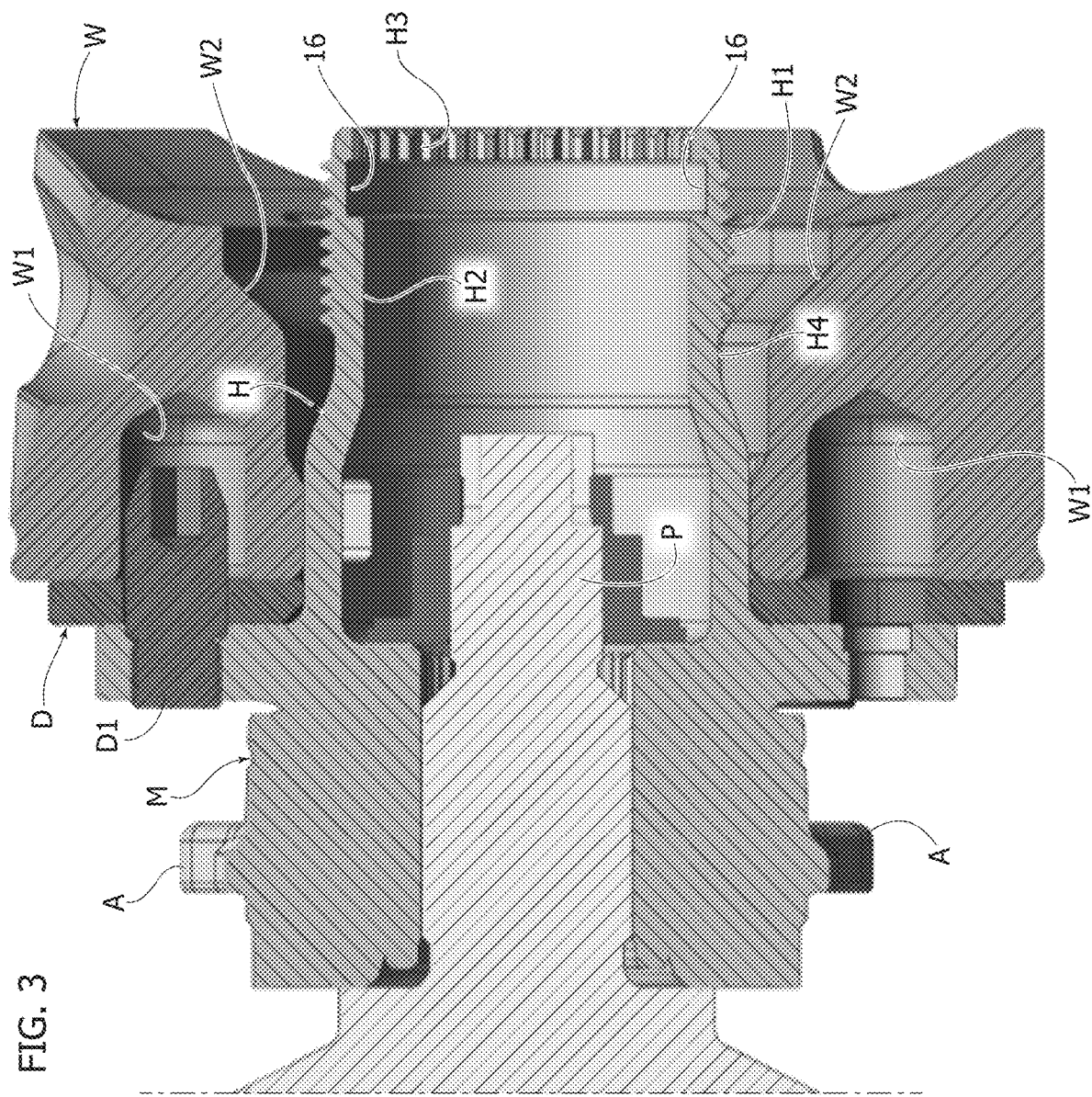
Figure 4:
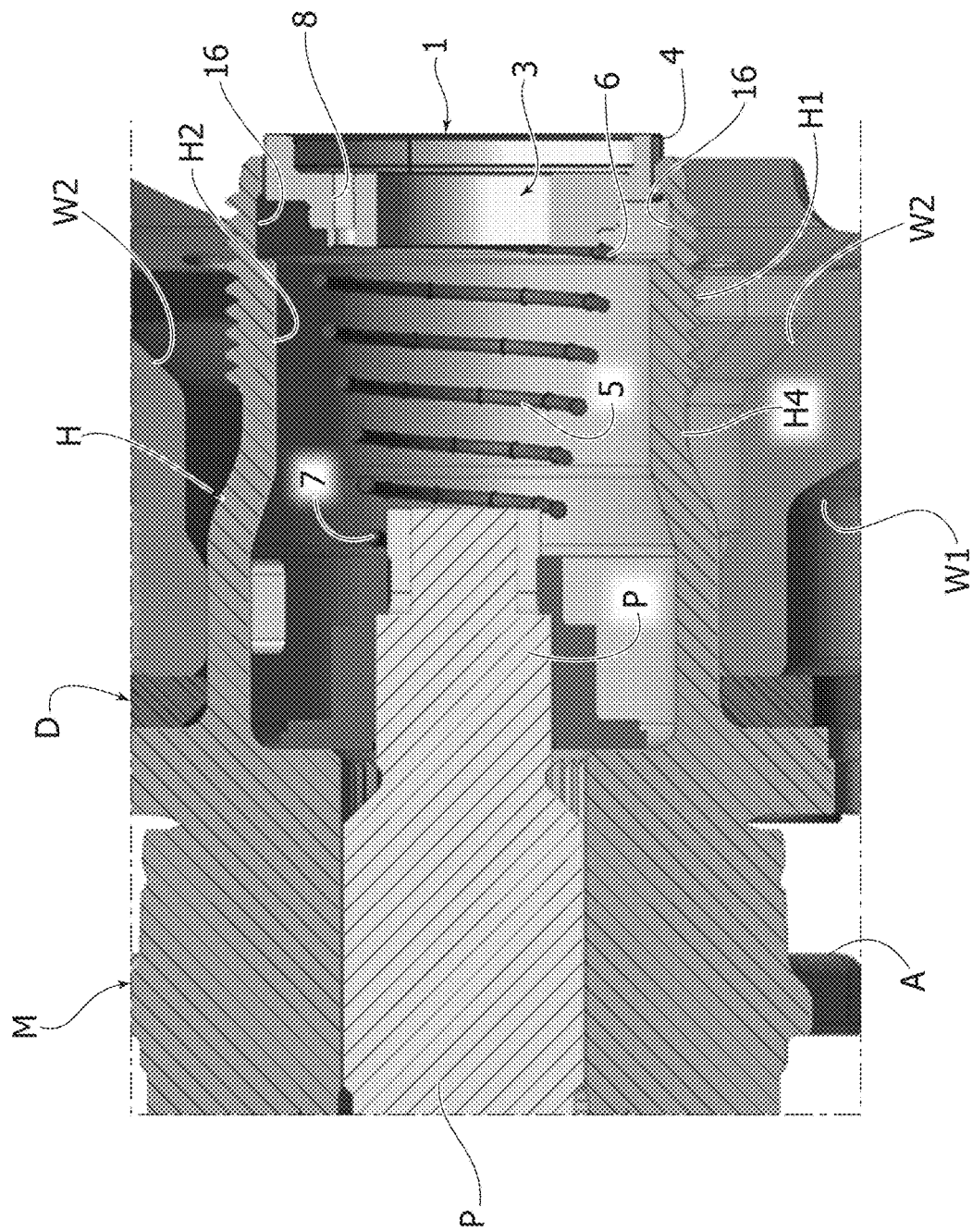
Figure 5:
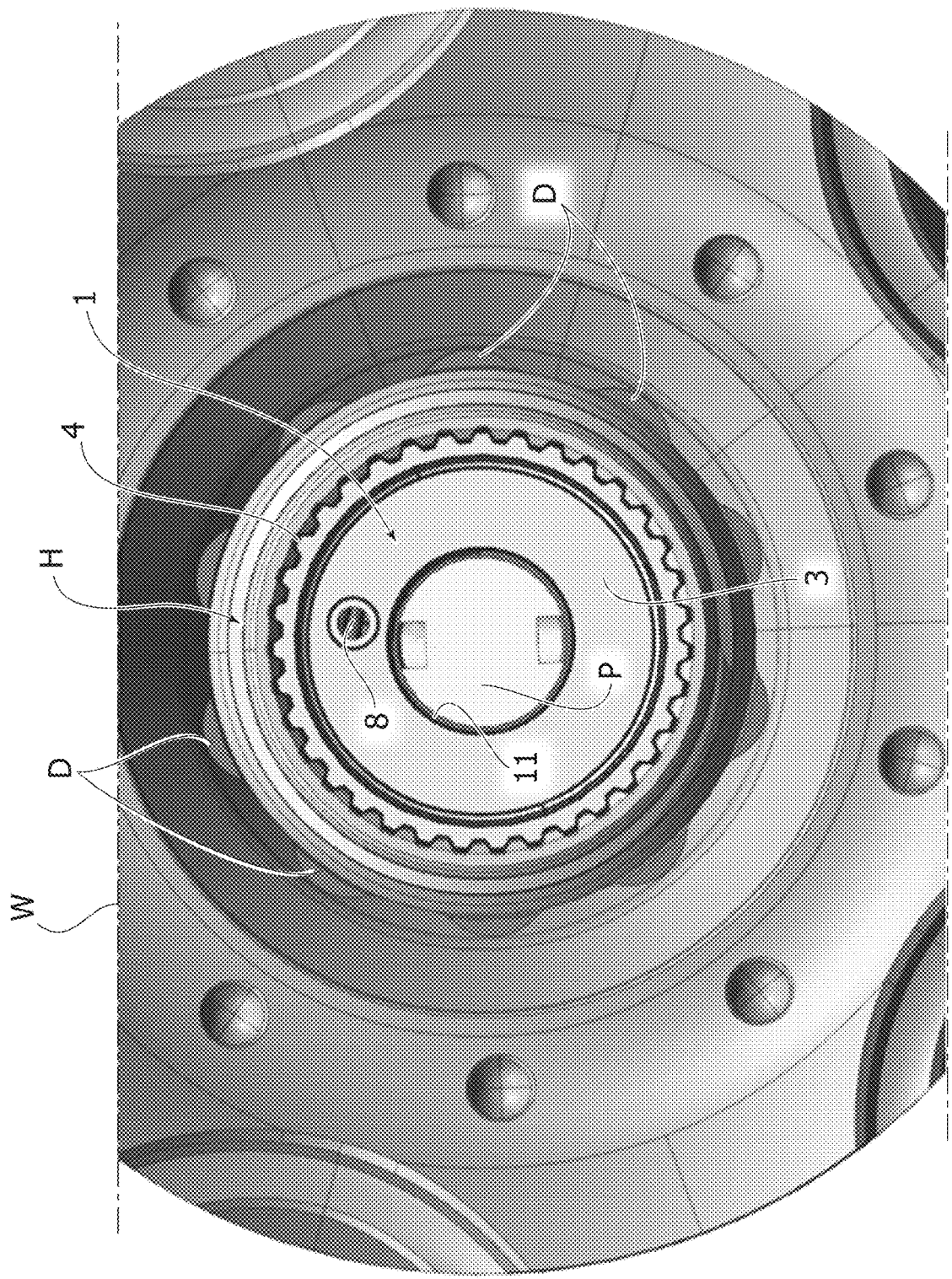
Figure 11:
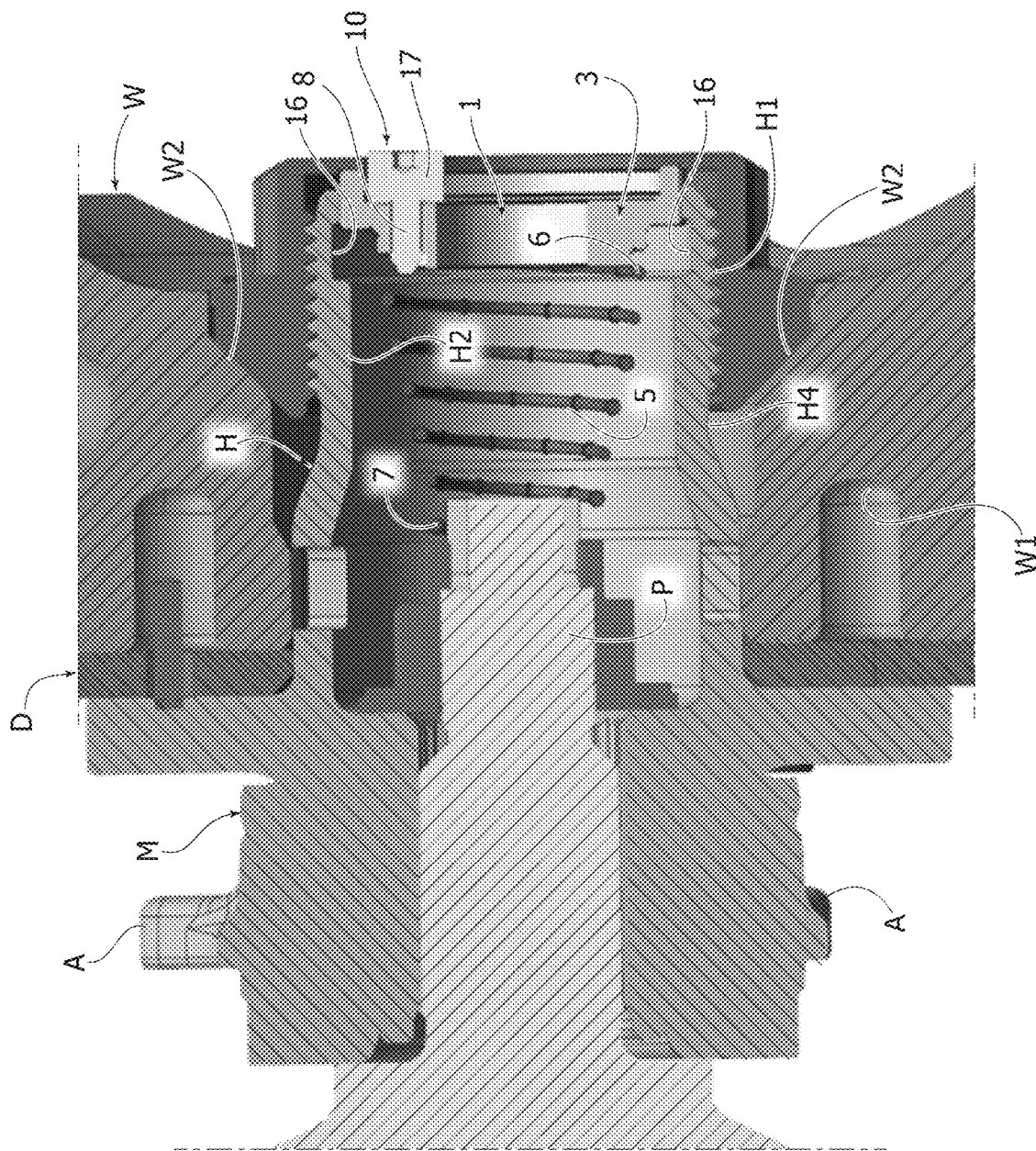
Figure 12:
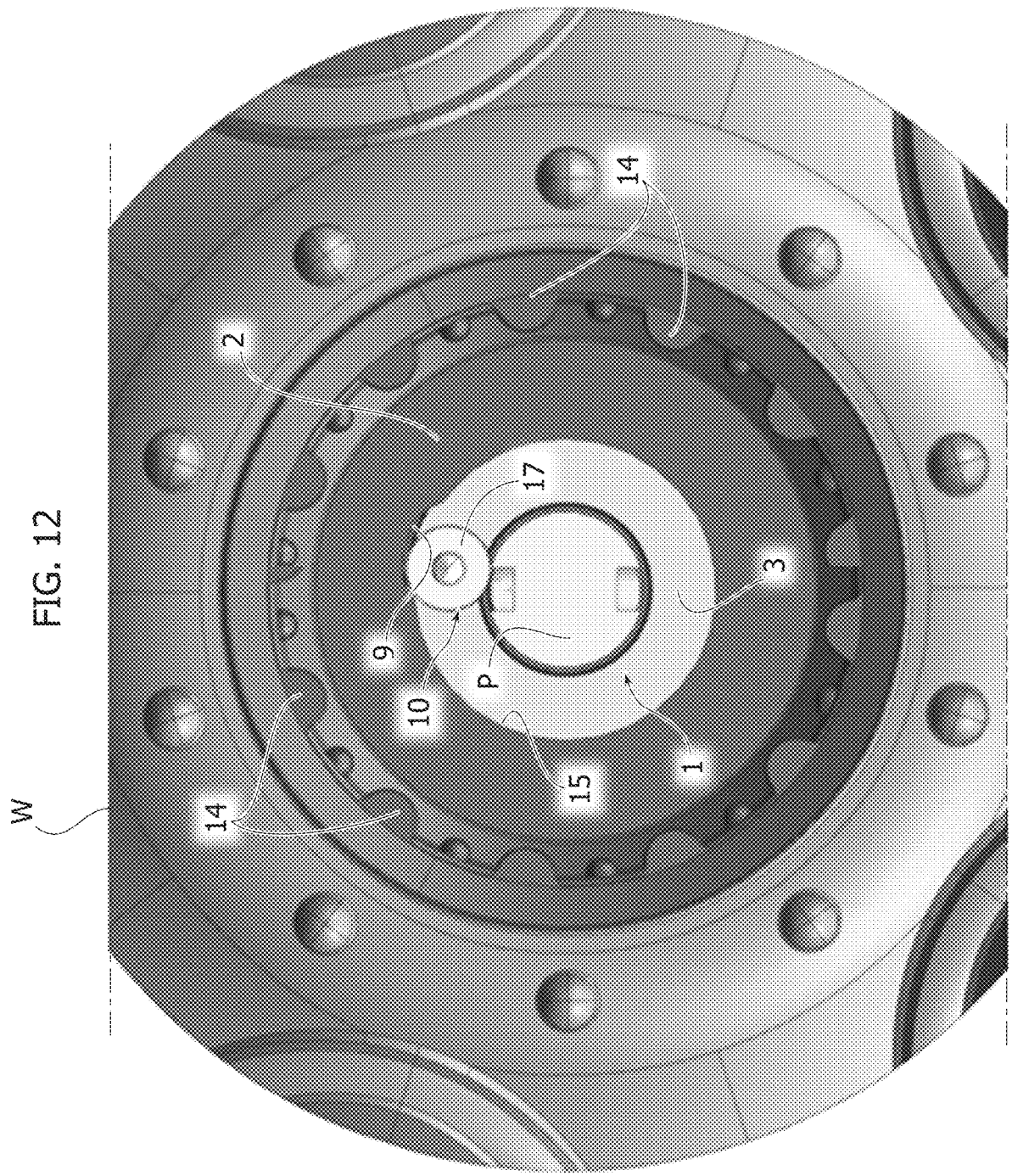

Further characteristics and advantages of the invention will become apparent from the description that follows with reference to the attached drawings, provided purely by way of non-limiting example, wherein:

FIG. 1 is an exploded perspective view illustrating a motor-vehicle wheel assembly including the device according to the present invention, FIGS. 2-4 are cross-sectional views that illustrate some preliminary steps of an assembly method for assembling the wheel assembly of FIG. 1, FIG. 5 is a front view of a partially assembled wheel assembly according to the criteria of the invention, FIGS. 6-11 are additional views that illustrate successive steps of the assembly method indicated above, and FIG. 12 is a front view of the motor-vehicle wheel assembly including the anti-loosening device, in the final assembled condition.

In the following description various specific details are illustrated aimed at a thorough understanding of examples of one or more embodiments. The embodiments may be implemented without one or more of the specific details, or with other methods, components, materials, etc. In other cases, known structures, materials or operations are not shown or described in detail to avoid obscuring various aspects of the embodiments. The reference to "an embodiment" in the context of this description indicates that a particular configuration, structure or characteristic described in relation to the embodiment is included in at least one embodiment. Therefore, phrases such as "in an embodiment", possibly present in different places of this description do not necessarily refer to the same embodiment. Moreover, particular conformations, structures or characteristics can be combined in a suitable manner in one or more embodiments and/or associated with the embodiments in a different way from that illustrated here, for example, a characteristic here exemplified in relation to a figure may be applied to one or more embodiments exemplified in a different figure.

The references illustrated here are only for convenience and do not therefore delimit the field of protection or the scope of the embodiments.

It should be noted that the conformation of the components exemplified in the figures should not be considered in any way limiting, but representative of one of the multiple embodiments incorporating unique characteristics of the invention.

In the attached drawings, reference 1 generally indicates a preferred embodiment of an anti-loosening device for a fastening unit of a motor-vehicle wheel according to the present invention.

FIG. 1 is an exploded perspective view of a motor-vehicle wheel assembly including the device 1 according to the invention, FIG. 1—according to a technique known per se—shows a wheel hub structure U and a motor-vehicle wheel W arranged to be connected to the hub structure U. It is noted that the construction details relating to the tire of the wheel W are not presented here, since these details can be made in any known way, and also since elimination of these details from the drawings makes the latter more readily and easily understood.

The wheel hub structure U comprises:
  a wheel upright M provided with a plurality of attachment points A for connecting to one or more members of a motor-vehicle suspension (not shown in the drawings),
  a brake disc D arranged to cooperate with at least one braking member (for example, a brake caliper), and
  a wheel hub H projecting from the brake disc D in an axial direction.

The reference D1 indicates a circumferential series of centering members, arranged protruding from the brake disc D along a direction parallel to the main axis of the hub H. As indicated in greater detail in the description that follows, these centering members D1 are designed to be selectively arranged within respective seats W1 obtained on the body of the wheel W, so as to achieve centering of the wheel W on the hub H. In the present description, the term "centering" means the correct angular positioning of the wheel W with respect to the hub H during assembly of the wheel W on the hub H, so as to transmit the driving torque and the braking torque. In alternative embodiments, the centering of the wheel W is carried out with the aid of a single centering member. Of course, the present invention is also applicable to the case in which these centering elements are not provided, since the transfer of the torque is carried out solely by means of the friction between the wheel and the hub without the use of driving devices.

The wheel hub H comprises an end thread H1 arranged for reciprocal coupling with a single-nut fastening unit 2 arranged to lock the wheel W on the hub H, once centering has occurred with respect to the latter. Greater details relative to this fastening unit 2 are indicated below in the present description.

FIG. 2 illustrates an enlarged cross-sectional view of the wheel hub structure U shown in the previous figure. According to an architecture known per se, the unit U is configured to receive a wheel pin P therein. The wheel pin P can be connected in rotation with a respective axle shaft (not illustrated in the drawings) by means of an articulated homokinetic joint, so as to form a traction wheel assembly. The details relating to the connection of the axle shaft with the differential gear of the motor-vehicle, as well as those relating to the suspension of this wheel W are not illustrated here, as they can be made in any known way, and as these details taken alone, do not fall within the scope of the present invention. Of course, the invention can be applied to both drive wheels and non-drive wheels.

Returning to the exploded perspective view of the wheel assembly of FIG. 1, the anti-loosening device 1 comprises a gear 3 and an elastic element 5 extending axially with respect to the gear 3. The gear 3 has outer teeth 4 arranged to cooperate, in an assembled condition of the wheel assembly, with inner teeth H3 of the wheel hub H, obtained at an end portion H4 of the hub H, along an inner surface H2 thereof. More particularly, the inner teeth H3 are arranged on the end edge of the hub H.

The assembly steps for assembling the motor-vehicle wheel assembly illustrated in FIG. 1, including the anti-loosening device 1, will now described in the description that follows.

FIG. 3 is a cross-sectional view that illustrates the wheel W centered on the wheel hub H. As indicated above, in this condition, the centering members D1 are arranged within respective seats W1 obtained on the body of the wheel W.

To easily center the wheel W with respect to the wheel hub H, a tool may be used (not illustrated in the drawings) incorporating the technical disclosures deriving from the patent application EP 20165839.0 in the name of the same Applicant, forming part of the state-of-the-art pursuant to Art. 54(3) EPC. As described in this patent application, the tool has a tubular body defining a coupling portion arranged for coupling to the wheel hub H, and a carrier portion for supporting the motor-vehicle wheel W during a centering step of the wheel W on the hub H. Of course, the centering of the wheel W on the wheel hub H can be carried out, in the case of the present invention, even without the aid of this tool.

FIG. 4 shows an enlarged cross-sectional view of the wheel W centered on the hub H, with the anti-loosening device 1 coupled to the wheel hub H.

Note how the anti-loosening device 1 is configured to be inserted within the wheel hub H along an axial direction, so that the main axis of the anti-loosening device 1 coincides with the wheel-hub axis. The outer teeth 4 of the gear 3 are configured to engage the inner teeth H3 of the wheel hub H. In the assembled condition illustrated in FIG. 4, the elastic element 5 is spaced along an axial direction with respect to the gear 3, in the direction of the wheel pin P protruding into the hub H from the side of the wheel upright M opposite the end of the hub H cooperating with the gear 3.

In one or more embodiments, as well as in that illustrated in the drawings, the elastic element 5 is a conical helical spring with a progressively smaller diameter along a direction moving away from the gear 3.

The elastic element 5 comprises a first end 6 connected to the gear 3 and a second end 7 configured to be engaged against at least one abutment and centering surface obtained inside the hub H. In one or more embodiments, as well as in the one illustrated in the drawings, this abutment and centering surface is defined by a wheel pin P extending within the hub H on the opposite side with respect to the inner teeth H3 (FIG. 4). More specifically, the first end 6 can be integrated directly into the body of the gear 3, while the second end 7 can be fitted onto the end of the wheel pin P, so that said second end 7 is supported by the wheel pin P, and is in abutment against an end portion of the wheel pin P.

In one or more embodiments, as well as in that illustrated in the drawings, the gear 3 has an annular conformation in that it includes a central hole 11 formed to allow drainage of water infiltrations possibly passing inside the assembled wheel assembly. The central hole 11 is also designed to reduce the overall weight of the device 1, and to achieve the centering of a socket for screwing during assembly.

As illustrated in the attached drawings, the anti-loosening device 1 further comprises a coupling element 8 obtained on a sector of the gear 3, along a direction substantially parallel to an axial direction of the gear 3.

As will become clear from the following description, the coupling element 8 is arranged to receive a corresponding fastening member 10 (illustrated in FIG. 1). In one or more embodiments, as well as in that illustrated in the drawings, the coupling element 8 is a threaded nut arranged to receive a corresponding threaded fastening screw 10.

FIG. 5 is a front perspective view of the components illustrated in FIG. 4, wherein the wheel W is centered on the hub H, with the anti-loosening device 1 coupled to the wheel hub H. In this condition, the wheel W is not yet locked onto the hub H, since the fastening unit 2 must still be applied onto the wheel-hub assembly.

In one or more embodiments, including that illustrated in the drawings, the wheel W has a series of recessed portions 12 (FIG. 1) arranged side by side on its inner circumferential wall. As illustrated in the assembled configuration of FIG. 5, wherein the wheel is centered on the hub H and arranged against the brake disc D, some portions of the brake disc D remain visible from an observation direction corresponding to that illustrated in FIG. 5 due to the aforesaid recessed portions 12. These recessed portions 12 are arranged to limit the contact between the wheel W and hub H during centering of the wheel, and to reduce the gluing effect by galvanic effect. In addition, the recessed portions 12 also allow reduction of the overall weight of the wheel assembly, and elimination of any humidity present inside.

Once the anti-loosening device 1 is arranged within the hub H, with mutual engagement between the outer teeth 4 of the gear 3 and the inner teeth H3 of the hub H, in order to lock the wheel W onto the hub structure U, the single-nut fastening unit 2 is applied onto the wheel hub H.

Returning to FIG. 1, the fastening unit 2 is defined by a single coupling nut having an inner thread 13 arranged to engage with the end thread H1 of the wheel hub H. The single-nut fastening unit 2 also comprises an outer portion with grooves 14 so as to facilitate gripping of the unit 2. The single-nut unit 2 also has a central hole 15, so that in the assembled condition of the wheel assembly, a part of the outer surface of the gear 3 is visible from the outside, despite the engagement of said single-nut fastening unit 2 on said wheel hub H. As will be evident from the following description, this characteristic is particularly relevant to allow an action on the device 1 despite the presence of the single-nut unit 2, as well as allowing the application of any friezes and/or marks.

As also indicated in the description that follows, the single-nut unit 2 has at least one anti-rotation sector 9 (also illustrated in FIG. 1), arranged at a portion of its inner circumferential wall defined by the central hole 15. In one or more embodiments, including those illustrated in the attached drawings, the anti-rotation sector 9 is defined by a cavity portion obtained along a sector of its inner circumferential wall. As indicated below, the anti-rotation sector 9 is configured to cooperate with the fastening member 10 engaged with the coupling element 8 obtained on the gear 3.

Figure 6:
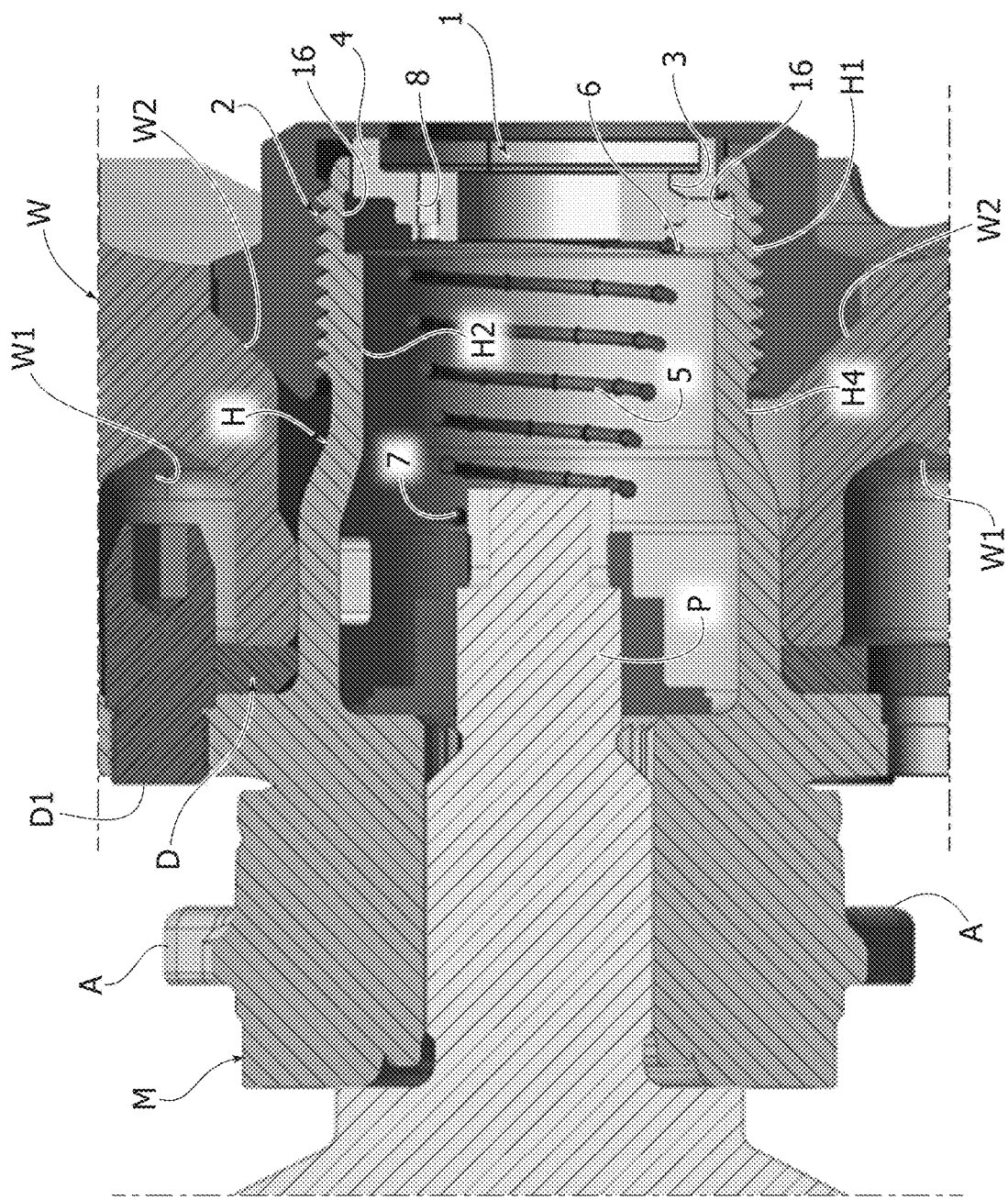

FIG. 6 is a cross-sectional view that illustrates the wheel assembly including the anti-loosening device 1, with the single-nut fastening unit 2 tightened on the hub H. Note that the wheel W has a recess portion W2 arranged to receive the single-nut unit 2 screwed on the hub H. As indicated above, the inner thread 13 of the unit 2 is engaged with the thread H1 of the wheel hub H, in such a way that the wheel W is blocked on the hub H.

Figure 7:
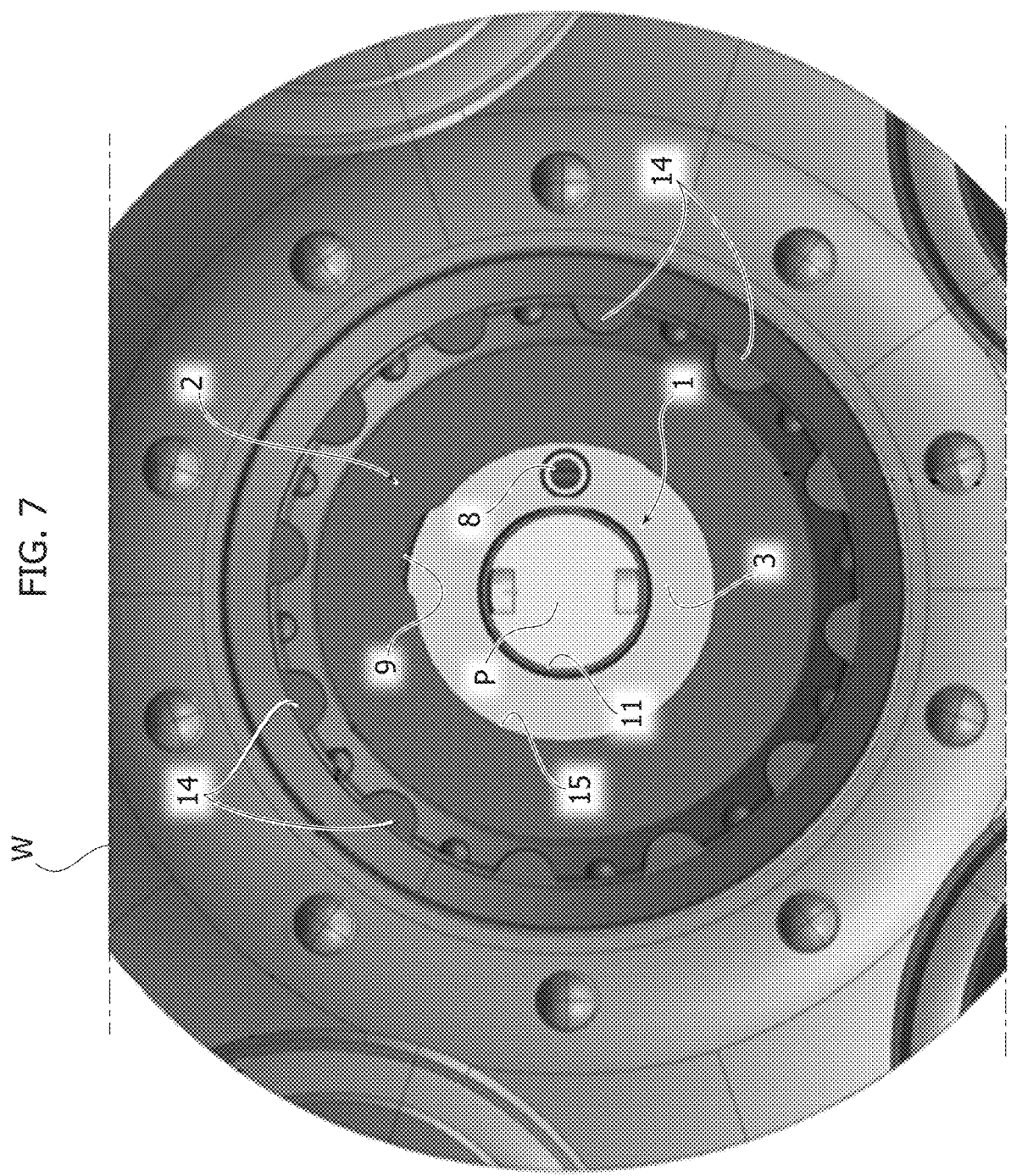

FIG. 7 is a front view of the wheel assembly with its components assembled in the configuration illustrated in FIG. 6.

As previously indicated, the single-nut unit 2 has an anti-rotation sector 9 at a portion of its inner circumferential wall, defined by a cavity portion. In the light of the above, it will therefore be appreciated that, as illustrated in FIG. 7, following the screwing of the single-nut unit 2 onto the hub H, the anti-rotation sector 9 is found radially misaligned with respect to the coupling element 8 of the anti-loosening device 1.

Figure 8:
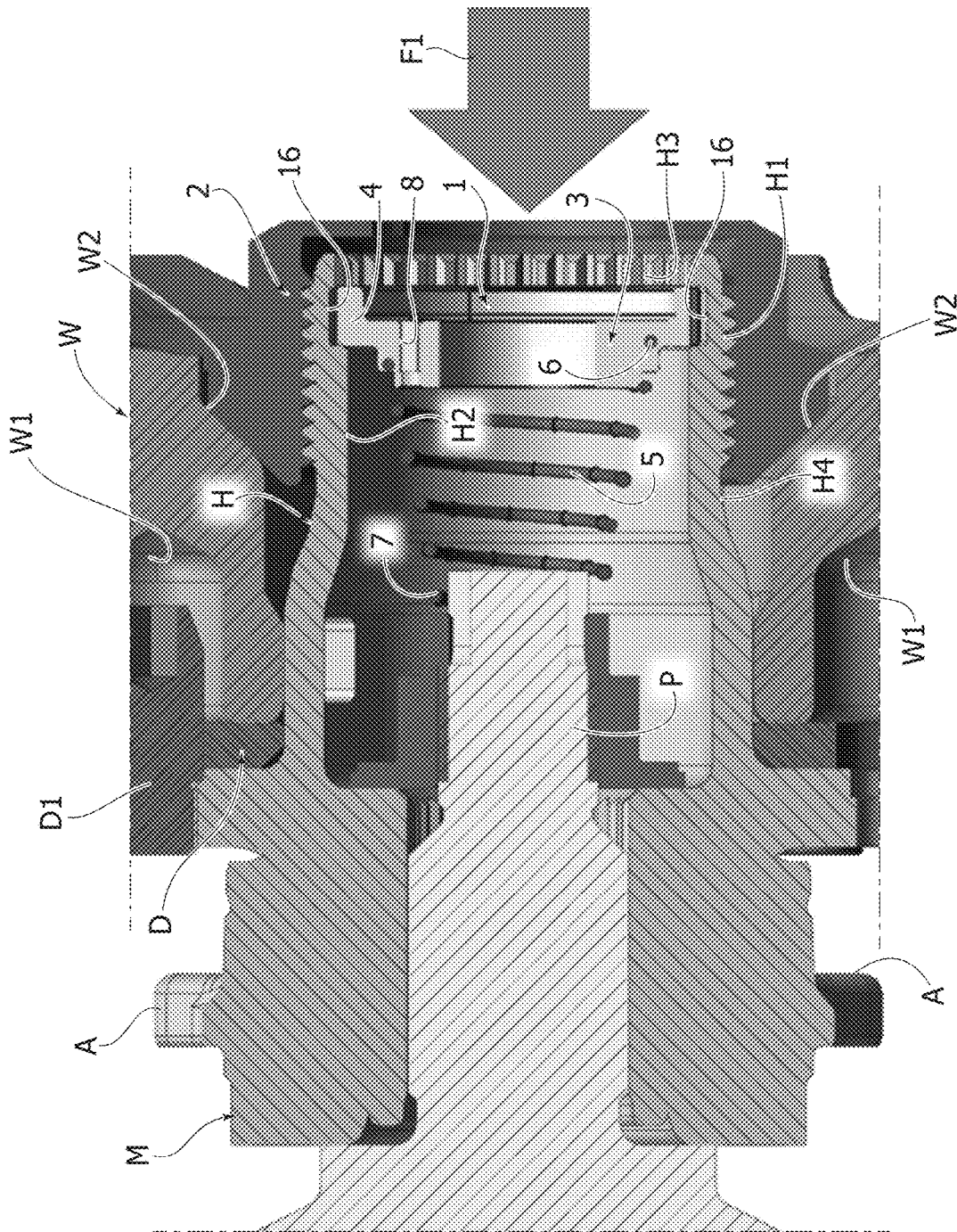
Figure 9:
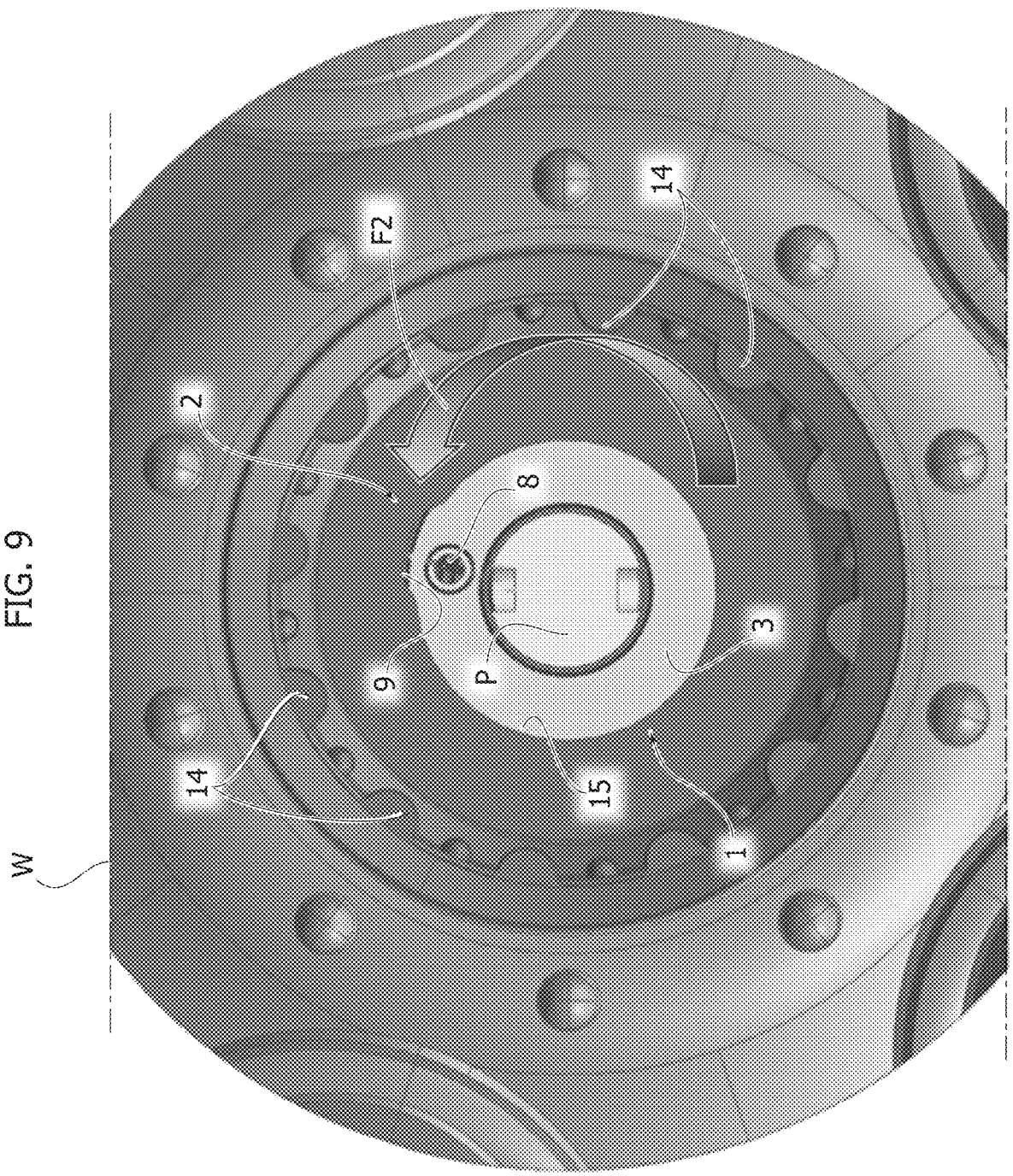
Figure 10:
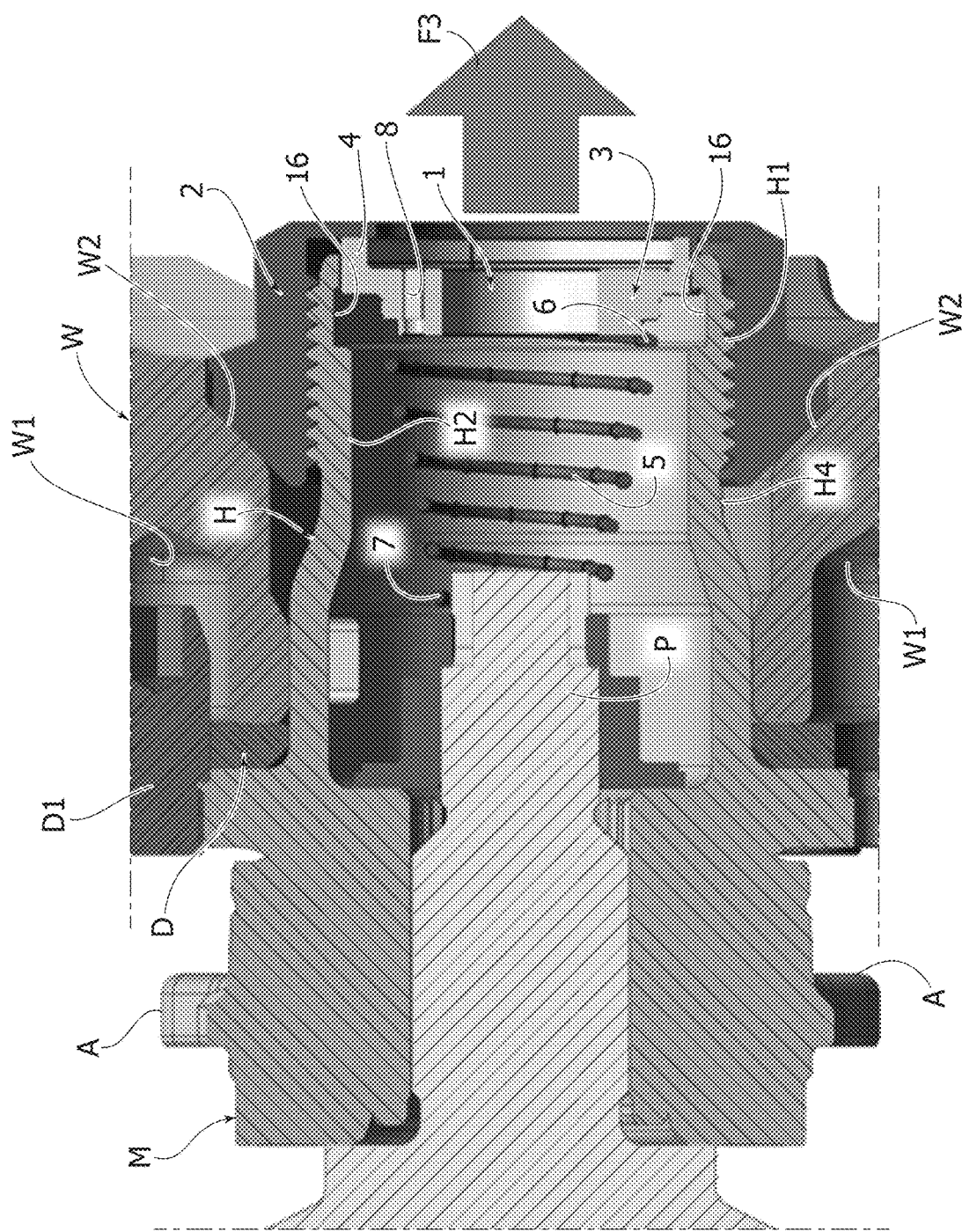

FIG. 8 is a cross-sectional view that illustrates a further assembly step of the wheel assembly including the anti-loosening device 1, to be implemented following the fastening of the single-nut unit 2 on the hub H.

By applying pressure on the outer surface of the gear 3, as indicated by the arrow F1 illustrated in FIG. 8, the anti-loosening device 1 is configured to position itself in a compressed configuration. In this configuration, the elastic element 5 is compressed, being configured to meet against an end portion of the wheel pin P. In the aforesaid compressed configuration, the gear 3 is in a decoupled position with respect to the inner teeth H3 of the wheel hub H. More specifically, the gear 3 is spaced within the wheel hub H in a more inner position with respect to the hub end H incorporating the inner teeth H3. As illustrated in FIG. 8, the gear 3 is arranged within a cavity portion 16 (also illustrated in FIGS. 2-4 and 6) obtained along the inner surface H2 of the wheel hub H. The cavity portion 16 is sized so as to define a space between the circumferential outer surface of the gear 3 having the outer teeth 4, and the inner surface of the aforesaid cavity portion 16. Thanks to this characteristic, by continuing to exert pressure on the gear 3, it is possible to rotate the anti-loosening device 1 around its main axis coinciding with the wheel-hub axis. As illustrated in the front view of FIG. 9, the rotation can be carried out in an anticlockwise direction (as indicated by the arrow F2) until reaching a position in which the coupling element 8 is radially aligned with respect to the aforesaid anti-rotation sector 9 of the single-nut unit 2. Of course, rotation of the anti-loosening device 1 can also be performed in a clockwise direction, to achieve the nut/anti-rotation sector 9 alignment.

Once the radial alignment between the anti-rotation sector 9 of the single-nut unit 2 and the coupling element 8 of the anti-loosening device 1 has been achieved, assembly of the wheel assembly proceeds by interrupting the pressure on the gear 3. Due to the interruption of the pressure exerted on the gear 3, the elastic element 5 is arranged to recall the gear 3, along the direction indicated by the arrow F3 in FIG. 10, into its engagement position with the inner teeth H3 of the wheel hub H, creating the assembled configuration of hub H, wheel W, device 1 and single-nut unit 2 shown in FIG. 10.

As illustrated in FIGS. 11 and 12, once the coupling element 8 and the anti-rotation sector 9 are radially aligned, it is possible to proceed by applying the fastening member 10 within the corresponding coupling element 8. This fastening member 10 comprises a head 17 arranged to cooperate with the aforesaid anti-rotation sector 9, in the condition coupled with the nut 8. The fastening member 10 can be made in the form of a threaded screw made of a particularly resistant material (e.g. titanium).

Thanks to these characteristics, in the final assembled condition of the wheel assembly including the anti-loosening device 1, the head 17 of the screw 10 cooperates with the aforesaid anti-rotation sector 9, so as to prevent mutual rotations between the single-nut unit 2 and the gear 3, by an angle greater than an angle defined by the size of the anti-rotation sector 9. Preferably, this angle measures about 10°. It will therefore be appreciated that, in the final assembled condition of the wheel assembly illustrated in FIG. 12, the interference between the screw 10 and the anti-rotation sector 9, therefore, guarantees a block against unloosening or over-screwing of the single-nut unit 2, while the inner teeth of the wheel hub H and the outer teeth of the gear 3 ensure a stable coupling between the components. It should be noted that the aforesaid angle, imposed by the main dimension of the anti-rotation sector 9, and which defines the maximum unloosening or over-screwing movement of the unit 2, is sized according to the number of teeth of the outer teeth 4, and the number of anti-rotation sectors 9 on the single-nut unit 2. In one or more alternative embodiments, the wheel assembly may have more than one anti-rotation sector 9 cooperating with a respective fastening member 10.

Thanks to the above characteristics, the anti-loosening device 1 according to the invention offers the following advantages:
- the anti-loosening device 1 lends itself to be easily implemented, in order to minimize the anomalies resulting from loosening or over-tightening the single-nut locking unit 2, and
- the anti-loosening device 1 is simple, low-cost and uniquely usable for wheels and hubs arranged on both sides of a motor-vehicle.

In light of the characteristics described above, one or more embodiments may concern a motor-vehicle wheel assembly comprising:
- a wheel hub H associated with a brake disc D,
- a motor-vehicle wheel W coupled to the wheel hub H so that the wheel axis coincides with the axis of the hub H,
- said motor-vehicle wheel W being locked on said wheel hub H by means of a fastening unit 2 fixed on the wheel hub H,
- said motor-vehicle wheel assembly further comprising an anti-loosening device 1 coupled to said wheel hub H, comprising:
- a gear 3 inserted within said wheel hub H along an axial direction, having outer teeth 4 cooperating with inner teeth H3 of the wheel hub H formed at an end portion H4 of the wheel hub H along an inner surface H2 thereof,
- an elastic element 5 extending axially with respect to said gear 3 within said wheel hub H, wherein the elastic element 5 comprises a first end 6 connected to the gear 3, and a second end 7 engaged against at least one abutment and centering surface obtained inside the wheel hub H,
- at least one coupling element 8 obtained on a sector of said gear 3 along a direction substantially parallel to an axial direction of the gear 3, wherein said coupling element 8 is arranged to receive a corresponding fastening member 10,
- said anti-loosening device 1 having a main axis coinciding with the axis of the wheel W and being arranged to create a compressed configuration, in which said elastic element 5 is in a compressed position and the gear 3 is decoupled with respect to said inner teeth H3 of the wheel hub H, and is arranged within a cavity portion 16 formed on the inner surface H2 of the wheel hub H, so as to allow rotation of the anti-loosening device 1 around said main axis;
- wherein, following a rotation of said anti-loosening device 1, said coupling element 8 is radially aligned with respect to a respective anti-rotation sector 9 obtained on said fastening unit 2,
- wherein, in the assembled condition of said wheel assembly, said fastening member 10 coupled to said coupling element 8 cooperates with said anti-rotation sector 9, to avoid loosening of the locking unit 2.

One or more embodiments may relate to a method for assembling a motor-vehicle wheel assembly comprising the following steps:
- providing a support unit U to support a motor-vehicle wheel W, comprising a wheel hub H, a wheel upright M, a brake disc D and a series of centering members D1 protruding from the brake disc D,
- centering the wheel W on the wheel hub H, so that the axis of the wheel W coincides with the axis of the hub H.
- providing an anti-loosening device 1 according to the characteristics indicated in claim 1,
- inserting said anti-loosening device 1 inside said wheel hub H along an axial direction, in such a way that a main axis of the anti-loosening device 1 coincides with the wheel axis, said outer teeth 4 cooperate with inner teeth H3 of the wheel hub H, said elastic element 5 is spaced within said wheel hub H, and said second end 7 of the elastic element 5 is engaged against at least one abutment and centering surface obtained inside the wheel hub H,
- fixing a single-nut fastening unit 2 on said wheel hub H to lock the wheel W onto the wheel hub H, said single-nut fastening unit 2 having a central hole 15, so that in the assembled condition of the wheel assembly, a part of the outer surface of the gear 3 is visible from the outside despite the engagement of said single-nut fastening unit 2 on said wheel hub H,
- applying pressure on said gear 3 along an axial direction, so as to compress said elastic element 5 and create a compressed configuration of anti-loosening device 1, wherein the gear 3 is decoupled with respect to said inner teeth H3 of the wheel hub H, and is arranged within a cavity portion 16 formed on the inner surface H2 of the wheel hub H, so as to allow rotation of the anti-loosening device 1 around said main axis,
- rotating said anti-loosening device 1 around said main axis to position the coupling element 8 in a radially aligned position with respect to a respective anti-rotation sector 9 obtained on the single-nut fastening unit 2,
- releasing said gear 3 and allowing said elastic element 5 to elastically recall the gear 3 into its position wherein said outer teeth 4 cooperate with said inner teeth H3 of the wheel hub H,
- tightening a fastening member 10 inside said coupling element 8, in such a way that said fastening member 10 coupled to said coupling element 8 obtained on the gear 3 cooperates with said anti-rotation sector 9, to avoid loosening of the locking unit 2.

Of course, without prejudice to the principle of the invention, the details of construction and the embodiments may vary widely with respect to those described and illustrated purely by way of example, without departing from the scope of the present invention.

What is claimed is:
1. An anti-loosening device for a fastening unit of a motor-vehicle wheel, wherein the motor-vehicle wheel is configured to be coupled with a wheel hub by means of said fastening unit, said anti-loosening device comprising:

a gear having outer teeth arranged to cooperate with inner teeth of the wheel hub obtained at an end portion of the wheel hub along an inner surface thereof, an elastic element extending axially with respect to said gear, having a first end connected to the gear, and a second end configured to be engaged against at least one abutment and centering surface obtained inside the wheel hub, at least one coupling element obtained on a sector of said gear, arranged to receive a corresponding fastening member, said anti-loosening device being configured to be arranged within the wheel hub along an axial direction, so that a main axis of the anti-loosening device coincides with the wheel axis, said anti-loosening device being arranged to create a compressed configuration, wherein the gear is decoupled with respect to said inner teeth and is arranged within a cavity portion obtained on the inner surface of the wheel hub, so as to allow rotation of the anti-loosening device around said main axis;

wherein, following a rotation of said anti-loosening device, said coupling element is arranged to be radially aligned with respect to a respective anti-rotation sector obtained on said fastening unit, in such a way that said fastening member coupled to said coupling element cooperates with said anti-rotation sector, to avoid loosening of a locking unit.

2. An anti-loosening device according to claim 1, wherein said elastic element is a conical helical spring with a progressively smaller diameter along a direction moving away from said gear.

3. An anti-loosening device according to claim 1, wherein said coupling element is a threaded nut, arranged to receive a corresponding threaded screw.

4. An anti-loosening device according to claim 1, wherein said gear has a central hole configured to allow drainage of water infiltrations possibly present in the wheel assembly including said device.

5. A method for assembling a motor-vehicle wheel assembly comprising the following steps:

providing a support unit to support a motor-vehicle wheel, comprising a wheel hub, a wheel upright, and a brake disc, centering the wheel on the wheel hub, so that the axis of the wheel coincides with the axis of the hub, providing an anti-loosening device according to claim 1, inserting said anti-loosening device inside said wheel hub along an axial direction, in such a way that a main axis of the anti-loosening device coincides with the wheel axis, said outer teeth cooperate with inner teeth of the wheel hub, the elastic element is spaced within said wheel hub, and said second end of the elastic element is engaged against at least one abutment and centering surface obtained inside the wheel hub, fixing a single-nut fastening unit on said wheel hub to lock the wheel onto the wheel hub, said single-nut fastening unit having a central hole, so that in the assembled condition of the wheel assembly, a part of the outer surface of the gear is visible from the outside despite the engagement of said single-nut fastening unit on said wheel hub, applying pressure on said gear along an axial direction, so as to compress said elastic element and create a compressed configuration of the anti-loosening device, wherein the gear is decoupled with respect to said inner teeth of the wheel hub and is arranged within a cavity portion formed on the inner surface of the wheel hub, so as to allow rotation of the anti-loosening device around said main axis, rotating said anti-loosening device around said main axis to position the coupling element in a radially aligned position with respect to a respective anti-rotation sector obtained on the single-nut fastening unit, releasing said gear, and allowing said elastic element to elastically recall the gear into its position wherein said outer teeth cooperate with said inner teeth of the wheel hub, tightening a fastening member inside said coupling element, in such a way that said fastening member coupled to said coupling element obtained on the gear cooperates with said anti-rotation sector, to avoid loosening of the locking unit.

6. A method according to claim 5, wherein said step of centering the wheel with respect to said centering members, so as to define the angular position of the wheel on the wheel hub, is carried out with the aid of a tool having a tubular body defining a coupling portion arranged for coupling to the wheel hub, and a carrier portion for supporting the motor-vehicle wheel during a wheel centering step on the hub.

7. A motor-vehicle wheel assembly comprising:

a wheel hub associated with a brake disc, a motor-vehicle wheel coupled to the wheel hub so that the wheel axis coincides with the axis of the hub, said motor-vehicle wheel being locked on said wheel hub by means of a fastening unit fixed on the wheel hub, said motor-vehicle wheel assembly further comprising an anti-loosening device coupled to said wheel hub, comprising:

a gear inserted within said wheel hub along an axial direction, having outer teeth cooperating with inner teeth of the wheel hub formed at an end portion of the wheel hub along an inner surface thereof, an elastic element extending axially with respect to said gear within said wheel hub, wherein the elastic element comprises a first end connected to the gear, and a second end engaged against at least one abutment and centering surface obtained inside the wheel hub, at least one coupling element obtained on a sector of said gear along a direction substantially parallel to an axial direction of the gear, wherein said coupling element is arranged to receive a corresponding fastening member, a main axis coinciding with the axis of the wheel and being arranged to create a compressed configuration, wherein said elastic element is in a compressed position, and the gear is decoupled with respect to said inner teeth of the wheel hub, and is arranged within a cavity portion formed on the inner surface of the wheel hub, so as to allow rotation of the anti-loosening device around said main axis;

wherein, following a rotation of said anti-loosening device, said coupling element is radially aligned with respect to a respective anti-rotation sector obtained on said fastening unit, wherein, in the assembled condition of said wheel assembly, said fastening member coupled to said coupling element cooperates with said anti-rotation sector, to avoid loosening of the locking unit.

8. A motor-vehicle wheel assembly according to claim 7, wherein said fastening unit is a single-nut fixing unit having an inner thread arranged to cooperate with an end thread of the wheel hub.

9. A motor-vehicle wheel assembly according to claim 8, wherein said single-nut fastening unit comprises a central hole, so that in the assembled condition of the wheel assembly, a part of the outer surface of the gear is visible from the outside despite the engagement of said single-nut fastening unit on said wheel hub.

10. A motor-vehicle wheel assembly according to claim 9, wherein said anti-rotation sector is obtained at a sector of an inner circumferential wall of the single-nut fastening unit defined by said central hole.

11. A motor-vehicle wheel assembly according to claim 10, wherein said anti-rotation sector is a cavity portion obtained at a sector of an inner circumferential wall of the single-nut fastening unit defined by said central hole.

12. A motor-vehicle wheel assembly according to claim 10, wherein said fastening member is an anti-rotation screw having a head arranged to be placed within a receptacle defined by said anti-rotation sector.

13. A motor-vehicle wheel assembly according to claim 7, wherein said anti-rotation sector has a main dimension which defines a maximum rotation angle of the fastening unit with respect to the device, due to the interference between said fastening member and said anti-rotation sector.

14. A motor-vehicle wheel assembly according to claim 7, wherein said brake disc is provided with at least one centering member protruding from the brake disc, said motor-vehicle wheel having at least one seat selectively coupled with said at least one centering member, so as to define the angular position of the wheel on the wheel hub during an assembly step.

15. A motor-vehicle wheel assembly according to claim 7, wherein said second end of the elastic element is fitted on a wheel pin protruding inside the hub at a side opposite to said inner teeth.

* * * * *